June 2, 1964            A. G. SCHRAMM            3,135,401
MOBILE VEHICLE FOR TRANSPORTING THE SCALE FOR WEIGHING
LOADED TRUCKS OPERATIVE ON HIGHWAYS
Filed May 17, 1962            2 Sheets-Sheet 1

INVENTOR.
ARTHUR G. SCHRAMM
BY Scott L. Nowriel
Atty.

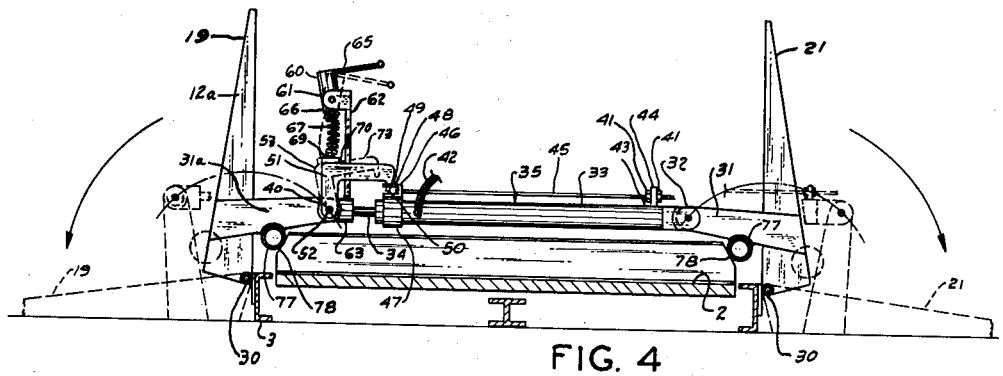

United States Patent Office 3,135,401
Patented June 2, 1964

3,135,401
MOBILE VEHICLE FOR TRANSPORTING THE SCALE FOR WEIGHING LOADED TRUCKS OPERATIVE ON HIGHWAYS
Arthur G. Schramm, Phoenix, Ariz., assignor to Allison Steel Manufacturing Co., Phoenix, Ariz., a corporation of Arizona
Filed May 17, 1962, Ser. No. 195,489
5 Claims. (Cl. 214—85)

This invention concerns a mobile vehicle for transporting a scale for weighing loaded trucks operating on highways.

Heretofore trucks have been weighed by determining the weight applied to the pavement of the several individual wheels and then calculating the weight of the entire truck from the measured weight applied to the wheels.

It is the desire of the authorities in charge of highway maintenance to weigh the trucks as rapidly as possible and not tie up traffic on the highway. Therefore, the weighing process is made just as short as possible and is made as simple as possible considering that the heavy weights must be handled rapidly and efficiently.

In view of the foregoing, one of the objects of the invention is to provide a scale which can be placed on the highway, and lowered into operating position, and is equipped with ramps which will make it possible for the trucks to be driven onto the scale weighing platform with a minimum of trouble and complication.

Another object is to provide a mobile weighing platform having hinged ramps which can be hinged from folded position suitable for operating the device in transport on the highway to an unfolded or weighing position; said hinged ramps being operated by hydraulic means and controlled by suitable latchable rams.

Still another object is to provide a means for holding the weighing platform, or weigh bridge, in an immovable fixed position while the scale is being transported from one weighing location to another.

A further object is to provide, in the device above mentioned, hydraulic mechanism which has means for latching the moving parts while the scale is in transport position thereby removing the load weight from the hydraulic pressure.

Still another object is to provide an adjustable latching means to attain the desired pressure needed to hold the weighing platform in an immovable or fixed position while in transport.

Other objects will appear hereinafter.

I attain the foregoing objects by means of the parts and combinations of parts shown in the accompanying drawings, in which—

FIGURE 4 is a sectional elevation of the device shown in FIGURE 1, as viewed on line 4—4, FIG. 3; and FIGURE 5 is a partial plan view of the central portion of the trailer body, drawn on an enlarged scale, and showing the ramps in raised position and showing the hydraulic mechanism used to operate the ramps.

Similar numerals refer to similar parts in the several views.

Figure 3:
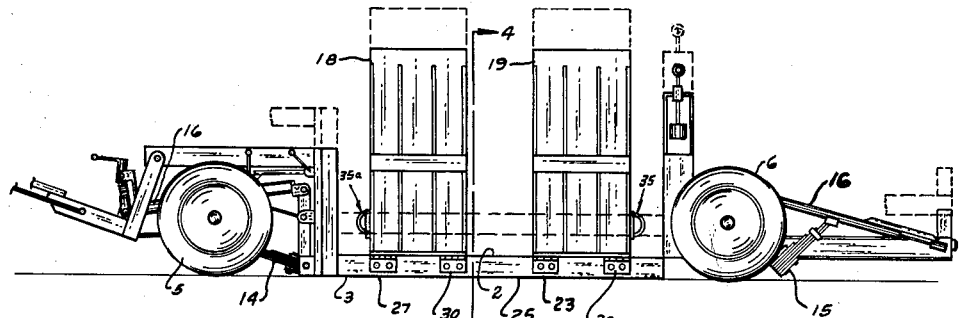
FIGURE 3 is a side elevational view of the device shown in FIGURES 1 and 2 with the body holding the weighing mechanism lowered to a position so that it will rest on the surface of the highway but with the hinged ramps in raised position.
Figure 1:
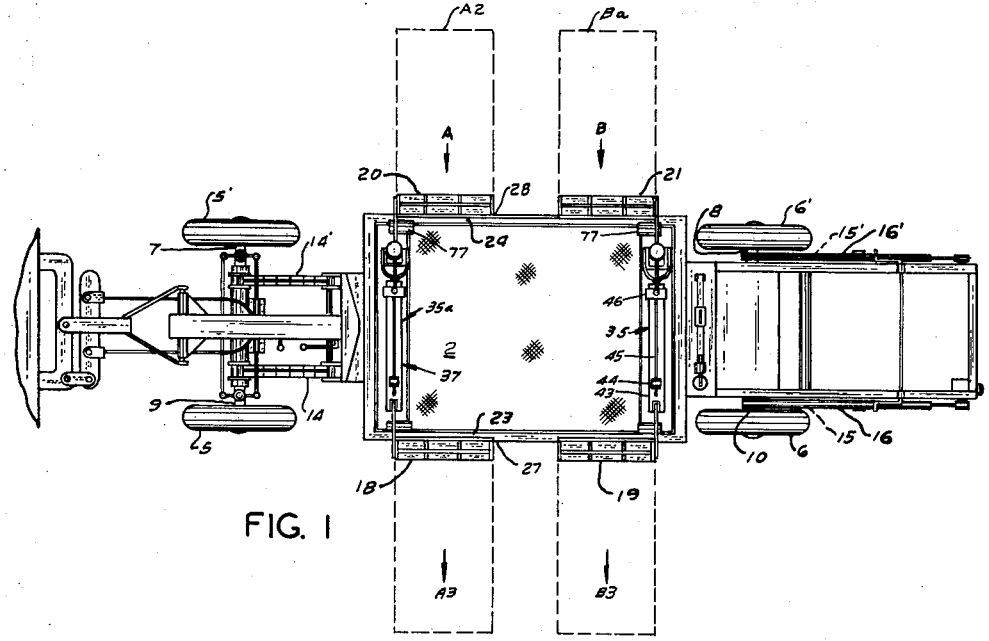
FIGURE 1 is a plan view of a wheeled trailer mechanism incorporating a weighing mechanism and having hinged approach ramps; said ramps being folded upward to a running position whereby the entire device may be operated upon the highway.
Figure 2:
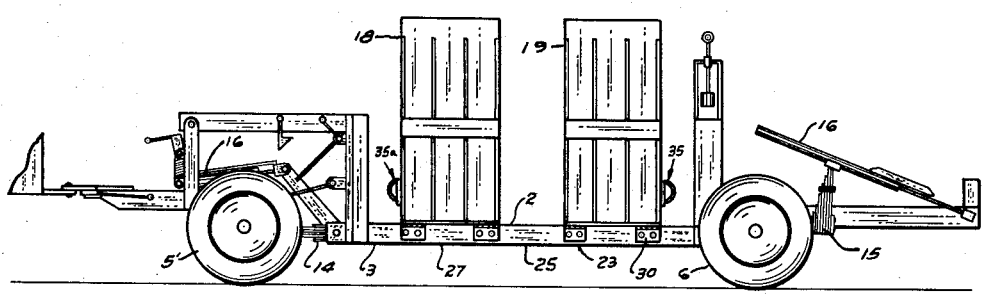
FIGURE 2 is a side elevational view of the same device, as shown in FIGURE 1, with the ramps also in raised or folded position.

As shown in FIGURES 1, 2 and 3, 2 indicates a weigh bridge supported on trailer body 3 which is, in turn, supported on wheels 5 and 6 and 5' and 6'. Said wheels are journalled on shafts 7, 8, 9 and 10 which are, in turn, supported on arms and springs 14 and 15 and 14' and 15' so that the wheels may be moved from, or toward, the ground to raise or lower the bed 3. In order to raise and lower the wheels with reference to the trailer bed 3, hydraulic cylinders and pistons 16 and 16' are used. This part of the disclosure is, however, not a part of this invention because it is covered in other patents which I either have obtained or are now pending.

The present disclosure concerns hydraulic mechanism for raising and lowering the ramps 18, 19, 20 and 21 which are hinged to the sides 23 and 24 of the body 3 of the trailer 2. Note that the central portion 25 of the trailer is somewhat lower than the end portions. This central portion is adapted to be lowered from the riding position, as shown in FIGURE 2, to the lowered or weighing position, as shown in FIGURE 3.

The ramps are all attached to the sides, such as 27 and 28 of the body by hinges 30. All hinges are the same. Each of the ramps is provided with an upstanding operating lever, such as 31 and 31a. The top end portions 32 of each of the ramps is coupled to either the cylinder 33 or the piston 34 of the hydraulic operating unit 35 which is supported on said levers above the level of the weigh bridge by the levers 31.

These hydraulic units 35 are positioned at the forward and rear sides of the weigh bridge so as to be out of the way and to not contact trucks or truck wheels driven up the ramps and onto the weigh bridge as indicated by A and B.

When the trailer body 25 is lowered, as shown in FIGURE 3, and the ramps are folded down, as indicated by the dotted lines A3 and B3, a truck or truck running gear may be driven up the ramps on one side of the weigh bridge and onto the weigh bridge. After weighing this truck it may be then moved down the ramps A3 and B3, as indicated by the dotted line in FIGURE 1.

While the truck, or truck running gear, is on the weigh bridge it is weighed in the usual manner by weight, indicated by balanced levers (not shown) and on calibrated scale weighing beams, also not shown. After the truck has been weighed, then the hydraulic units 35 and 35a are operated to draw the ramps up to the inoperative position, as shown in FIGURE 3. Thereafter, the wheels 5, 6, 5' and 6' are lowered with reference to the body which it at the same time raised and the device is then ready for operation on the highway, as shown in FIGURE 2.

Referring to FIGURE 4, note that the cylinder 33, which is pivotally connected to the lever 31, and the piston cross head 40, which is on the end of piston rod 34, is pivotally connected to the lever 31a on ramp 12a. Operation of oil into or from pipe 42, connected to cylinder 33, will cause the piston to reciprocate in cylinder 33. This oil can be taken from any pump mechanism (not shown) as may be desired.

On top of cylinder 33 and at the head end 43 of the cylinder there is a lug 44 to which the stop rod 45 is attached. This rod extends to the left end of the cylinder and is attached to a bracket 46 on the sliding sleeve 47. The bracket has an upper arm 48 which has a hole 49 to receive the pointed end pin 50 of the latch bar 51. This latch bar is, in turn, pivoted at 52 to the piston rod head 40. Operation of the latch, as indicated by dotted lines 53, will insert or withdraw the end pin 50 from the hole or holes that may be provided in the bracket part 46.

A latch operating lever 60 is pivotally supported on lugs 61 on an upward extension bracket 62. The lower end of this bracket is attached to the piston rod head 63. This is the same head as that to which the latch lugs 51 are attached. The latch operating lever 60 is operated by a manual lever 65. The lower end 66 of the latch body is connected to a strain spring 67. The lower end of this spring 69 is connected to the top portion 70 of the latch bar. The strain spring has sufficient compression forced on it so that it will hold the latch by compression in either the latched position, as shown in solid lines, or in unlatched position with pin 49 withdrawn, as shown by dotted lines 73.

This mechanism constitutes a holding latch so that the movable parts of the hydraulic mechanism may be mechanically locked in place independently of oil pressure in cylinder 33.

While in the above paragraph I have described the mechanism shown at the right hand, or rear end, of FIGURE 1, it is to be understood that a left hand or fore counter part mechanism is positioned and operative on the fore portion of the body as indicated by 37.

The ramps are brought into upraised or riding position and stops 77 on levers 31 and 31a of all ramps contact the front and rear lateral edges of the weigh bridge on the angularly disposed surfaces 78. As a result of this, the weigh bridge is held down and locked in place against lateral movement. The parts that bear on the weighing levers (not shown) which communicate the weighing motion to the scale parts are held against vibration, and there is little road movement communicated to these working parts.

Rod 45 has adjusting jamb nuts 41 on each side of lug 44 to adjust rod 45 on sliding sleeve 47 and latch bracket 46. This latch bracket is made adjustable so that when the point 50 of latch bar 51 is hooked into latch bracket 46 the tension on the latching mechanism can be adjusted by the jamb nuts 41 which operate on each side of lug 44 to thereby attain the desired pressure at points 78 to hold the weighing platform in an immovable position while the device is in transport.

In operation, after the weigh bridge has been set in weighing position, as indicated in FIGURE 3, and the weighing has been performed, the ramps are raised, as shown in FIGURE 4 and the latches 51 are set to hold the ramps in place. Hand lever 65 is used to determine this motion.

After the device has been used in one location for weighing trucks and the like, it may be easily folded and placed in running position, as shown in FIGURE 2, and taken to a different location. In this way officers are not compelled to weigh vehicles in one location but can move to a more desirable location when desired.

I claim:
1. A raisable and lowerable trailer having a body with longitudinal side members, running wheels on said trailer body, mechanism operative between said wheels and said body to raise said body to an elevated running position and to lower said body to a weighing position, a weighing platform on said trailer body, ramps hinged at their inner ends to the longitudinal side members of said trailer body and extendable laterally outward from said body when said body is in lowered position, and extending upward from said body when it is in elevated running position; operating levers on the inner portions of said ramps extending substantially at right angles to said ramps, hydraulic cylinder and ram mechanism on said body attached to said levers on said ramps to raise and lower said ramps on their attaching hinges, and latches on said rams operative to hold said rams in a position to maintain said ramps in raised position independent of hydraulic pressure in said cylinders.

2. A mobile scale for weighing running gear of trucks to determine the weight of the truck as applied to the highway, comprising a trailer having a raisable and lowerable body with longitudinal side members on said body, a weighing platform on said trailer body, ramps hinged at their inner ends to the longitudinal side members of said trailer body, and extendable laterally outward from said body when said body is lowered and resting on the highway surface, and extendable upward from said body when not in use; operating levers on the inner portions of said ramps extending substantially at righ angles to said ramps, hydraulic cylinder and ram mechanism on said body, attached to said levers on said ramps to raise and lower said ramps on their hinges, and latches on said rams operative to hold said rams in position to maintain said ramps in raised position independently of hydraulic pressure in said cylinders.

3. A trailer having a body with longitudinal side members, raisable and lowerable wheels operative thereon, mechanism operative between said wheels and said body to raise and lower said body from an elevated running position to a lower weighing position, a weighing platform on said trailer body, ramps hinged at their inner ends to the longitudinal side members of said trailer body and extendable laterally outward from said body when said body is in lowered position on the surface of said highway; operative levers on the inner portion of said ramps extending substantially upward at right angles to said ramps, hydraulic cylinder and ram mechanism disposed transversely on said body attached to said levers on said ramps and connecting said levers to raise and lower said ramps on their attaching hinges, and latches on said rams to hold said rams in a position to maintain said ramps in raised position independently of hydraulic pressure in said cylinders; said ramps having upwardly extending brackets to support said latches.

4. A mobile scale for weighing running gear of trucks to determine the weight of the truck as applied to the highway, comprising a trailer having a raisable and lowerable body with longitudinal side members on said body, ramps hinged at their inner ends to the longitudinal side members of said trailer body, and extendable laterally outward from said body when said body is lowered and resting on the highway surface, and extendable upward from said body when not in use; operating levers on the inner portions of said ramps extending substantially at right angles to said ramps, hydraulic cylinder and ram mechanism on said body, attached to said levers on laterally opposite ramps to raise and lower said ramps, and latches on said rams operative between said cylinders and said rams consisting of slidable sleeves supported on said rams and the adjacent open ends of said cylinders, lugs on the end portions of said cylinders, piston rod heads on said rams having pivotally attached latches with latch bars terminating in latching end pins, stop rods attached to the said lugs on said cylinders by jamb nuts bearing on each side of said lugs, brackets attached to said slidable sleeves, and operating levers connected to said latching levers by strain springs disposed to hold said latching levers in either latched or unlatched position.

5. The mechanism described in claim 4 wherein the weighing platform has outwardly and upwardly bevelled lateral edges, and said operating levers have cylindrical stops disposed to contact and hold the bevelled side edges of said weighing platform when said ramps are hinged to fully raised position, so that said platform is secured against movement during transport.

References Cited in the file of this patent
UNITED STATES PATENTS

| | | |
|---|---|---|
| 2,706,626 | Reiser | Apr. 19, 1955 |
| 2,720,325 | Kay | Oct. 11, 1955 |
| 2,759,737 | Manning | Aug. 21, 1956 |
| 2,776,133 | Bates | Jan. 1, 1957 |
| 2,823,911 | Murphy | Feb. 18, 1958 |
| 2,922,534 | Vodraska | Jan. 26, 1960 |
| 2,954,137 | Ash | Sept. 27, 1960 |